US010554521B1

(12) United States Patent
Terechko et al.

(10) Patent No.: US 10,554,521 B1
(45) Date of Patent: Feb. 4, 2020

(54) HEALTH MONITORING OF WIRELESS CONNECTIONS AMONG VEHICLES

(71) Applicant: NXP B.V., Eindhoven (NL)

(72) Inventors: Andrei Sergeevich Terechko, Eindhoven (NL); Johannes Martinus Bernardus Petrus Van Doorn, Berghem (NL); Gerardo Henricus Otto Daalderop, Best (NL); Han Raaijmakers, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/103,378

(22) Filed: Aug. 14, 2018

(51) Int. Cl.
*H04L 12/26* (2006.01)
*H04W 4/46* (2018.01)
(Continued)

(52) U.S. Cl.
CPC ....... *H04L 43/0835* (2013.01); *G05D 1/0088* (2013.01); *G05D 1/0295* (2013.01);
(Continued)

(58) Field of Classification Search
CPC .... H04L 43/0835; H04W 4/46; H04W 4/023; H04W 4/026; H04W 4/027; H04W 24/10; G05D 1/0088; G05D 1/0295; G08G 1/22
See application file for complete search history.

(56) References Cited

U.S. PATENT DOCUMENTS 8,907,814 B2 12/2014 Chen
2007/0293232 A1 12/2007 Nonaka
(Continued)

FOREIGN PATENT DOCUMENTS

EP 0991046 A1 5/2000
EP 2 187 530 A1 5/2010

OTHER PUBLICATIONS

K. Kunert et al., "Enhancing reliability in IEEE 802.11 based real-time networks through transport layer retransmissions," International Symposium on Industrial Embedded System (SIES), Trento, 2010, pp. 146-155.

(Continued)

*Primary Examiner* — Duc C Ho
(74) *Attorney, Agent, or Firm* — Rajeev Madnawat (57) ABSTRACT

Certain aspects of the disclosure are directed to methods and apparatuses for health monitoring of wireless connections among vehicles. An example method can include receiving as input to processing circuitry configured and arranged to monitor a health status of wireless communications links between a plurality of vehicles in a vehicle platoon, object information including coordinates of stationary and moving objects, and determining, using the received object information, a relative location of a vehicle among the plurality of vehicles in the vehicle platoon. The method further includes determining, based on the received object information and the relative location of the vehicle, physical parameters for line-of-sight wireless communications between the vehicle and other vehicles in the vehicle platoon. The health status of the wireless communications links can be determined between the plurality of vehicles in the vehicle platoon using the physical parameters for the line-of-sight wireless communications.

20 Claims, 7 Drawing Sheets

(51) Int. Cl.
  *H04W 4/02*   (2018.01)
  *H04W 24/10*  (2009.01)
  *G08G 1/00*   (2006.01)
  *G05D 1/02*   (2020.01)
  *G05D 1/00*   (2006.01)

(52) U.S. Cl.
  CPC .............. *G08G 1/22* (2013.01); *H04W 4/023* (2013.01); *H04W 4/026* (2013.01); *H04W 4/027* (2013.01); *H04W 4/46* (2018.02); *H04W 24/10* (2013.01)

(56) References Cited

U.S. PATENT DOCUMENTS

| | | |
|---|---|---|
| 2017/0223733 A1 | 8/2017 | Nakata |
| 2017/0308097 A1 | 10/2017 | Switkes et al. |
| 2018/0082591 A1* | 3/2018 | Pandy .................. B60W 10/04 |
| 2018/0113476 A1* | 4/2018 | Giles .................... B60W 10/04 |
| 2018/0143650 A1* | 5/2018 | Klaus .................... B60W 30/14 |
| 2019/0025857 A1* | 1/2019 | Luckevich ........... G05D 1/0295 |
| 2019/0265726 A1* | 8/2019 | Switkes ................ B60W 30/14 |
| 2019/0306678 A1 | 10/2019 | Byun et al. |

OTHER PUBLICATIONS

N. Lyamin et al., "Real-Time Detection of Denial-of-Service Attacks in IEEE 802.11p Vehicular Networks," in IEEE Communications Letters, vol. 18, No. 1, pp. 110-113, Jan. 2014.

M. Larsson et al., "Curvature based antenna selection method evaluated using the data age metric and V2V measurements," 2015 IEEE International Conference on Communication Workshop (ICCW), London, 2015, pp. 2356-2362.

K. Karlsson et al., "On the effect of vertical spatial diversity on V2V communication for three different platooning scenarios," 2015 9th European Conference on Antennas and Propagation (EuCAP), Lisbon, 2015, pp. 1-5.

* cited by examiner

HEALTH MONITORING OF WIRELESS CONNECTIONS AMONG VEHICLES

OVERVIEW

Aspects of various embodiments are directed to health monitoring of wireless connections among vehicles. In recent years, there have been proposed automatic vehicle following control systems for controlling a plurality of following vehicles (e.g., a platoon) to automatically follow one another. Vehicle platooning often refers to the linking of two or more vehicles in a convoy, using connectivity technology and automated driving support systems which allow the vehicles to travel together, actively coordinated in formation. These vehicles can automatically maintain a close distance between each other when they are connected for certain parts of a journey, for instance on motorways. The vehicle at the front of the platoon acts as the leader, with the vehicles behind reacting and adapting to changes in movement of the front vehicles—requiring little to no action from drivers of the following vehicles. Vehicle platooning allows for at least some of the vehicles in the platoon to be at least partly autonomous. Some advantages of platooning include increased fuel and traffic efficiency, safety and driver comfort.

Vehicular communication systems enable vehicles to wirelessly communicate with each other to exchange traffic information and/or generate safety warnings depending on the traffic information. Improvements in vehicular communication systems have been developed due to advances in vehicle to vehicle (V2V) communication technology and with advances in infrastructures that support such V2V communication technology. Communication enabled vehicles and infrastructure can form a cooperative system where the users exchange information and cooperate to improve characteristics such as safety, fuel economy, traffic efficiency and comfort. However, the effectiveness and reliability of vehicular communication systems is limited by the ability of vehicles to wirelessly communicate with one another. A failure in the wireless communication between vehicles in a platoon may prevent important information from being received, and thereby jeopardizing the reliability of the vehicle platoon. While some wireless communication systems constantly perform health checks, these health checks do not account for the mutual position of the vehicles in a platoon, and may miss a failure in a channel due to assumptions made about the health of the communications links between the vehicles.

These and other matters have presented challenges to health monitoring of wireless connections among vehicles.

Accordingly, aspects of the present disclosure are directed to issues such as those addressed above and/or to other issues which may become apparent.

SUMMARY

Various example embodiments are directed to health monitoring of wireless connections among vehicles. In connection with other example embodiments, aspects of the disclosure are directed to a monitoring system which accounts for information on vehicles' mutual position and orientation when assessing the connectivity between the vehicles.

In a particular more-specific example embodiment, a method of health monitoring of wireless connections among vehicles involves using physical parameters for line-of-sight wireless communications between the vehicles in the vehicle platoon to determine the health status of the wireless communications links between the vehicles. More specifically, the method includes receiving as input to processing circuitry configured and arranged to monitor a health status of wireless communications links between a plurality of vehicles in a vehicle platoon, object information including coordinates of stationary and moving objects. Using the received object information, a relative location of a vehicle among the plurality of vehicles in the vehicle platoon is determined. Based on the received object information and the relative location of the vehicle, physical parameters for line-of-sight wireless communications between the vehicle and other vehicles in the vehicle platoon are determined. The health status of the wireless communications links between the plurality of vehicles in the vehicle platoon is then determined using the physical parameters for the line-of-sight wireless communications.

In another specific example embodiment, an apparatus for health monitoring of wireless connections among vehicles includes determining the health status of the wireless communications links between vehicles based on packets received from a primary antenna. A plurality of antennas are disposed on an external surface of a first vehicle, where each respective antenna is coupled to communications circuitry configured and arranged to facilitate communication with other vehicles in a vehicle platoon using a vehicle-to-vehicle communications protocol. Processing circuitry is configured and arranged to monitor a health status of wireless communication links between the first vehicle and at least one other vehicle in the vehicle platoon. Particularly, the processing circuitry is configured and arranged to receive from at least one antenna disposed on an external surface of a second vehicle in the vehicle platoon, object information including coordinates of stationary and moving objects within a threshold distance of the first vehicle and the second vehicle. A position and orientation of the second vehicle relative to the first vehicle is determined, using the received object information, and at least one of the plurality of antennas of the second vehicle is identified as a primary antenna, based on the position and orientation of the second vehicle. The processing circuitry is configured and arranged to determine the health status of the wireless communications links between the first vehicle and the second vehicle based on packets received from the primary antenna of the second vehicle by the plurality of antennas of the first vehicle.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving health monitoring of wireless connections among vehicles. Vehicular communication systems enable vehicles to wirelessly communicate with each other to exchange traffic information and/or generate safety warnings depending on the traffic information. Improvements in vehicular communication systems have been developed due to advances in vehicle to vehicle (V2V) communication technology and with advances in infrastructures that support such V2V communication technology. Communication enabled vehicles and infrastructure can form a cooperative system where the users exchange information and cooperate to improve characteristics such as safety, fuel economy, traffic efficiency and comfort. However, the effectiveness and complete reliability of vehicular communication systems is limited by the ability of vehicles to wirelessly communicate with one another. A failure in the wireless communication between vehicles in a platoon may prevent important information from being received, and thereby jeopardizing the reliability of the vehicle platoon. While some wireless communication systems constantly perform health checks, these health checks do not account for the mutual position of the vehicles in a platoon, and may miss a failure in a channel due to assumptions made about the health of the communications links between the vehicles. Vehicular communication systems enable vehicles to wirelessly communicate with each other to exchange traffic information and/or generate safety warnings depending on the traffic information.

Various embodiments of the present disclosure are directed to a method of health monitoring of wireless connections among vehicles involves using physical parameters for line-of-sight wireless communications between the vehicles in the vehicle platoon to determine the health status of the wireless communications links between the vehicles. The method includes receiving as input to processing circuitry configured and arranged to monitor a health status of wireless communications links between a plurality of vehicles in a vehicle platoon, object information including coordinates of stationary and moving objects. Using the received object information, a relative location of a vehicle among the plurality of vehicles in the vehicle platoon may be determined. Moreover, based on the received object information and the relative location of the vehicle, physical parameters for line-of-sight wireless communications between the vehicle and other vehicles in the vehicle platoon may be determined. From the physical parameters for the line-of-sight wireless communications, the health status of the wireless communications links between the plurality of vehicles in the vehicle platoon may be determined.

In various embodiments, determining a relative location of a vehicle among the plurality of vehicles in the vehicle platoon includes determining a relative position, orientation, and physical dimensions of the vehicle. Moreover, each of the plurality of vehicles in the vehicle platoon may include a plurality of antennas configured and arranged to wirelessly communicate with the other vehicles in the vehicle platoon using a vehicle-to-vehicle communications protocol. In such embodiments, less than all of the antennas may be identified as primary antennas, and an error signal may be generated in response to a determination that communications packets were not received from at least one of the primary antennas within a threshold period of time. The primary antennas refer to or include antennas that, given the size and orientation of the vehicles, should be capable of receiving and/or transmitting signals to another vehicle in the platoon. As less than all of the antennas may be identified as primary antennas, a remainder of the antennas may be identified as secondary antennas. The secondary antennas refer to or include antennas which may be obstructed, given the size and orientation of the vehicles, and therefore may not be capable of receiving and/or transmitting signals to another vehicle in the platoon. Accordingly, the method includes determining the health status of the wireless communications links between the plurality of vehicles based on a percentage of packets received from the primary antennas and the secondary antennas. In further embodiments, the method includes determining a packet drop rate corresponding to a percentage of data packets not received over the wireless communications links during a sampling time, and determining the health status of the communications links based on the packet drop rate during the sampling time.

In another specific example embodiment, an apparatus for health monitoring of wireless connections among vehicles includes determining the health status of the wireless communications links between vehicles based on packets received from a primary antenna. Particularly, such apparatus can include a plurality of antennas disposed on an external surface of a first vehicle, wherein each respective antenna is coupled to communications circuitry configured and arranged to facilitate communication with other vehicles in a vehicle platoon using a V2V communications protocol. The apparatus can further include processing circuitry configured and arranged to monitor a health status of wireless communications links between the first vehicle and at least one other vehicle in the vehicle platoon. The processing circuitry can monitor a health status of wireless communications links by receiving from at least one antenna disposed on an external surface of a second vehicle in the vehicle platoon, object information including coordinates of stationary and moving objects within a threshold distance of the first vehicle and the second vehicle. Using the received object information, the processing circuitry can determine a position and orientation of the second vehicle relative to the first vehicle. Moreover, the processing circuitry can monitor a health status of wireless communications links by identifying at least one of the plurality of antennas of the second vehicle as a primary antenna, based on the position and orientation of the second vehicle, and determining the health status of the wireless communications links between the first vehicle and the second vehicle based on packets received from the primary antenna of the second vehicle by the plurality of antennas of the first vehicle.

In some embodiments, the processing circuitry is configured and arranged to send messages to the vehicles in the platoon regarding the health status of the communications links. For instance, the processing circuitry can be configured and arranged to send to the second vehicle, a message indicating the wireless communications links between the first vehicle and the second vehicle are unhealthy, in response to a determination that more than a threshold number of packets were not received from a primary antenna (e.g., that packets were not received from the primary antenna of the second vehicle by the plurality of antennas of the first vehicle). Additionally and/or alternatively, the processing circuitry may be configured and arranged to monitor the health status of wireless communications links between the first vehicle and the second vehicle, by analyzing at a predetermined time frequency, a packet drop rate for data packets transmitted from the primary antenna of the second vehicle to the plurality of antennas of the first vehicle. The health status of the communications links may be determined based on this packet drop rate. For instance, the processing circuitry can be configured and arranged to determine that the wireless communications links between the first vehicle and the second vehicle are unhealthy in response to the packet drop rate exceeding a predefined threshold.

In various example embodiments, the processing circuitry is configured and arranged to send to the second vehicle, a message communicating a change in the vehicle platoon in response to a determination that the wireless communications links between the first vehicle and the second vehicle are unhealthy. For instance, the change in the vehicle platoon may include an increase in a following distance between the first vehicle and the second vehicle. Additionally and/or alternatively, the change in the vehicle platoon may include instructions for both the first vehicle and the second vehicle to disengage from the vehicle platoon.

In another specific example embodiment, a plurality of antennas can be disposed on an external surface of each vehicle in a vehicle platoon. Each respective antenna can be coupled to communications circuitry configured and arranged to facilitate communication with other vehicles in the vehicle platoon using a V2V communications protocol. Moreover, each respective vehicle can include processing circuitry configured and arranged to monitor a health status of wireless communications links between the vehicle and a remainder of the vehicles in the vehicle platoon, by receiving from the remainder of vehicles in the vehicle platoon, object information including coordinates of stationary and moving objects within a threshold distance of the vehicle platoon. Moreover, the processing circuitry of each respective vehicle can determine, using the received object information, a position and orientation of the vehicle relative to the remainder of vehicles, and identify at least one of the plurality of antennas of the vehicle as a primary antenna and at least one of the plurality of antennas of the vehicle as a secondary antenna, based on the position and orientation of the vehicle. Further, the processing circuitry of each respective vehicle can determine the health status of the wireless communications links between the vehicle and the remainder of vehicles in the vehicle platoon based on packets received from the primary or secondary antenna of the vehicle.

In various example embodiments, the processing circuitry is further configured and arranged to communicate to the plurality of vehicles in the vehicle platoon, instructions to perform additional health status checks of the wireless communications links in response to a determination that communications packets were not received from the primary antenna within a threshold period of time. For instance, in response to a determination that the communications links between at least two vehicles in the platoon are unhealthy, additional health status checks may be performed. As such, the processing circuitry may be configured and arranged to communicate to the plurality of vehicles in the vehicle platoon, instructions to modify configuration of the vehicle platoon in response to a determination that communications packets were not received from the primary antenna within a threshold period of time.

As discussed further herein, the processing circuitry can be configured and arranged to construct a model (a "world model", e.g., concerning the objects/terrain relevant to the travel and/or route) which is used to determine the health status of the communications links between the vehicles. For instance, the model can include a graphical representation of the stationary and moving objects within a threshold distance of the vehicle platoon, and may be constructed using the object information received from the remainder of the vehicles in the vehicle platoon. In such embodiments, the position and orientation of the vehicle is determined using the constructed model. Similarly, the processing circuitry may construct the model of the stationary and moving objects within the threshold distance of the vehicle platoon, using topological maps and sensor data received from the remainder of the vehicles in the vehicle platoon. Additionally and/or alternatively, the processing circuitry can be configured and arranged to construct the model of the stationary and moving objects within the threshold distance of the vehicle platoon, using sensor data received from the remainder of the vehicles in the vehicle platoon.

In various example embodiments, the processing circuitry can be configured and arranged to determine for each of the remainder of vehicles in the vehicle platoon, a position, an orientation, and a dimension of the respective vehicle, and to determine, using the object information, which of the wireless communications links between the vehicles in the vehicle platoon may be obstructed based on the determined position, orientation, and dimension of each respective vehicle in the vehicle platoon. In such embodiments, the processing circuitry is configured and arranged to determine if the wireless communications links between a first vehicle in the vehicle platoon and a second vehicle in the vehicle platoon may be obstructed by determining if a stationary or moving object obstructs a line-of-sight between the antennas of the first vehicle and the antennas of the second vehicle.

While various example embodiments are described herein with regards to monitoring wireless communications between a plurality of vehicles, the method, apparatus and system described herein may be applied to monitor wireless communication within a single vehicle. For instance, the same method of health monitoring based on a world model can check operation of wireless nodes within a same vehicle, which always have static positions relative to each other. Such nodes can, for example, reside in the same vehicle and their fixed positions and associated obstacles can be hard-coded in the world model. Accordingly, if packets are not received between the wireless nodes of the vehicle, this can be an indication that an error state is present within the vehicle, and the communications links within the vehicle are unhealthy. In response to a determination that such communications links are unhealthy, an error message or other message may be sent to a user and/or operator of the vehicle such that appropriate action may be taken, as discussed herein.

Figure 1:
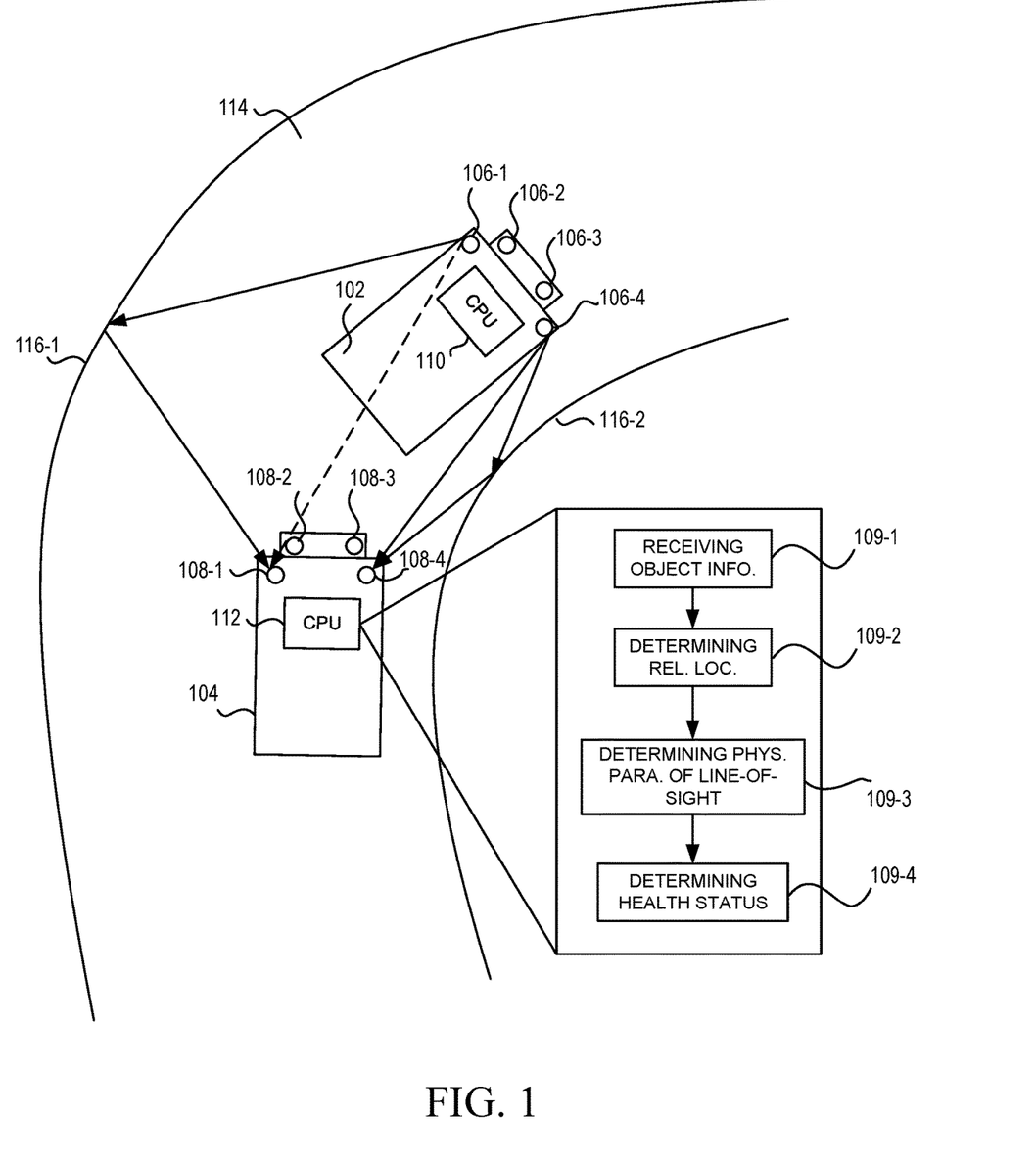
FIG. 1 illustrates an environment for health monitoring of wireless connections among vehicles, in accordance with the present disclosure.

Turning now to the figures, FIG. 1 illustrates an environment for health monitoring of wireless connections among vehicles, in accordance with the present disclosure. Particularly, FIG. 1 illustrates a vehicle platoon including a first vehicle 102 and a second vehicle 104. As illustrated in FIG. 1, the first vehicle 102 includes a plurality of antennas 106-1, 106-2, 106-3, 106-4 (collectively referred to herein as antennas 106) disposed on an outer surface of the vehicle. While the antennas are represented in FIG. 1 with a simplified circular structure, one of ordinary skill in the art will appreciate that antennas including various designs and structural components (with associated communications fields) may be used without departing from the true spirit and scope of various aspects of the present disclosure. In the embodiment illustrated in FIG. 1, the first vehicle 102 is positioned in front of the second vehicle 104, which also has a plurality of antennas 108-1, 108-2, 108-3, 108-4 (collectively referred to herein as antennas 108). While the first vehicle 102 is turning right on the roadway 114 (as illustrated), the signals from the antennas 106 on the first vehicle 102 may be obstructed and not received by the antennas 108 on the second vehicle 104. For example, signals from antenna 106-4 on the top right of the first vehicle 102 may be received by antenna 108-4 of the second vehicle 104 by direct line-of-sight, and by reflection off of side rail 116-2. In contrast, signals from the antenna 106-1 on the top left of the first vehicle 102 may be received by antenna 108-1 by reflection off of side rail 116-1, but the direct line-of-sight signal from antenna 106-1 to antenna 108-1 may be obstructed by the trailer from the first vehicle 102. In such an instance, the central processing unit (CPU) 110 of the first vehicle 102 and the CPU 112 of the second vehicle 104 may determine which antennas are primary antennas, and which antennas are secondary antennas. The primary antennas are antennas that, given the size and orientation of the vehicles, should be capable of receiving and/or transmitting signals to another vehicle in the platoon. The secondary antennas refer to antennas which may be obstructed, given the size and orientation of the vehicles, and therefore may not be capable of receiving and/or transmitting signals to another vehicle in the platoon. In the example shown in FIG. 1, the front right antenna (106-4) of the first vehicle 102 is a primary antenna, whereas the front left antenna (106-1) of the first vehicle 102 is a secondary antenna.

The CPUs of the first and second vehicles can, together or independently from one another, determine the health status of the wireless connections between the vehicles. For instance, in the example shown in FIG. 1, the CPU 110 of the first vehicle 102 and the CPU 112 of the second vehicle 104 can, at 109-1, receive as input to processing circuitry configured and arranged to monitor the health status of wireless communications links between the first vehicle 102 and the second vehicle 104, object information including coordinates of stationary and moving objects including the first vehicle 102 and the second vehicle 104. Subsequently, the CPUs can determine, at 109-2 and using the received object information, a relative location of a vehicle among the plurality of vehicles in the vehicle platoon. For instance, the CPUs can determine the relative location of vehicle 102 in relation to vehicle 104. In response, the CPUs can determine, at 109-3, based on the received object information and the relative location of the vehicle, physical parameters for line-of-sight wireless communications between the vehicle and other vehicles in the vehicle platoon. In various embodiments, determining a relative location of a vehicle among the plurality of vehicles in the vehicle platoon includes determining a relative position, orientation, and physical dimensions of the vehicle. For instance, the CPUs can determine that, based on the position, orientation, and physical dimensions of vehicle 102 relative to vehicle 104, that the trailer of vehicle 102 may obstruct signals from at least some of the antennas 106 of vehicle 102.

In response, the CPUs can, at 109-4, determine the health status of the wireless communications links between the vehicles 102 and 104, using the physical parameters for the line-of-sight wireless communications. For instance, the CPUs can determine that signals are not received from a primary antenna within a threshold period of time. An error signal may be generated in response to a determination that communications packets were not received from at least one of the primary antennas within a threshold period of time. For instance, each of vehicles 102 and 104 may receive an error message indicating that packets were not received from at least one of the primary antennas within a threshold period of time, and the communications links between vehicles 102 and 104 may be deemed unhealthy. Various additional and/or alternative embodiments may be employed to determine the health status of the communications links. For instance, a packet drop rate may be determined corresponding to a percentage of data packets not received over the wireless communications links during a sampling time, and the health status of the communications links may be determined based on the packet drop rate during the sampling time. In various embodiments, the sampling time for a single packet is 20 milliseconds, and a communications link is deemed healthy as long as no more than two packets were dropped within two consecutive sampling times (e.g., over a 40 millisecond period of time). Embodiments are not so limited, however, and different sampling times and/or packet drop rates may be used. Additionally and/or alternatively, the health status of the communications links may be determined based on a percentage of packets that are dropped during the sampling time. For instance, a communications link may be deemed healthy as long as at least 90% of the packets transmitted during the sampling time were received.

Figure 2:
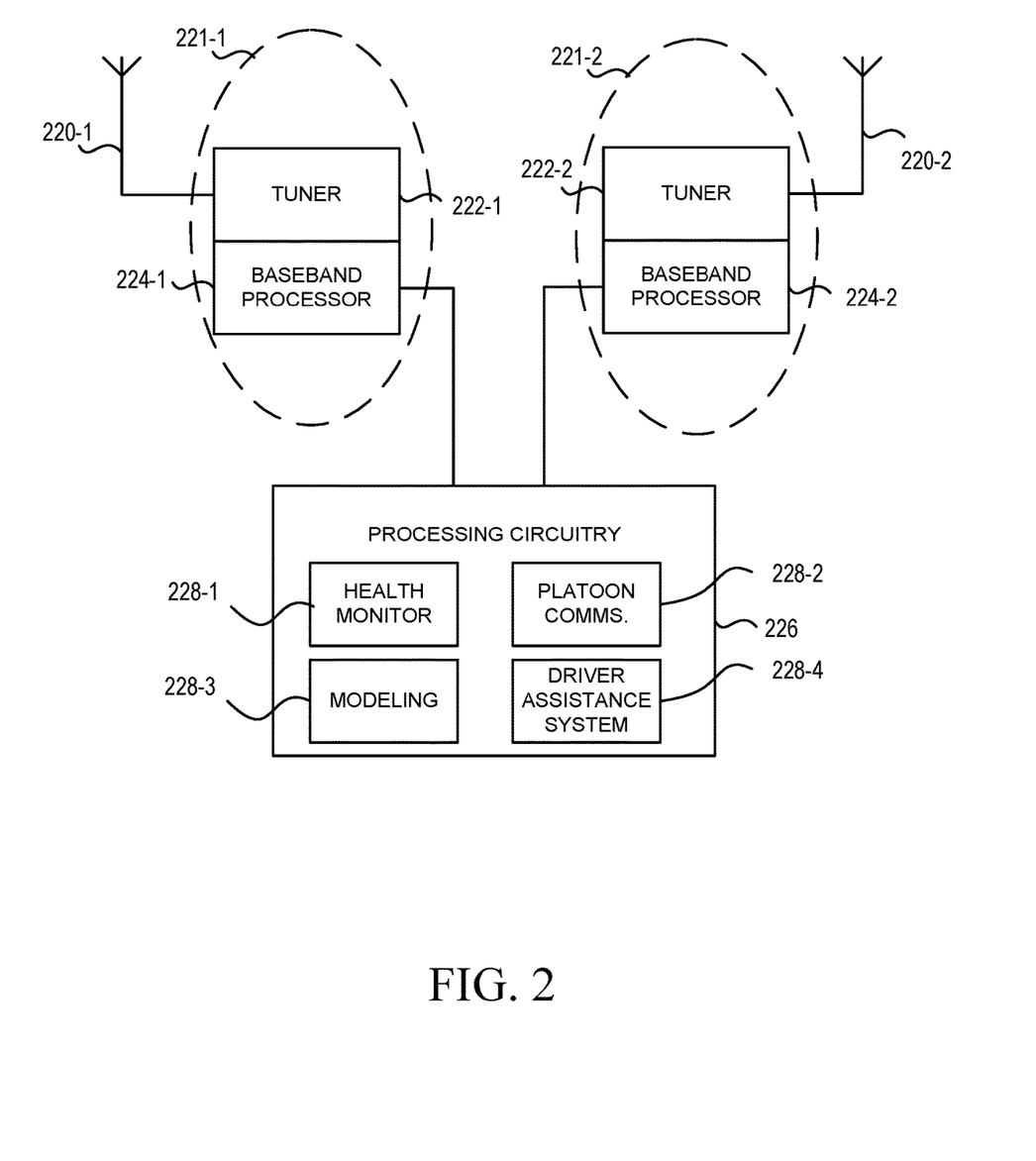
FIG. 2 illustrates an apparatus for health monitoring of wireless connections among vehicles, in accordance with the present disclosure.

FIG. 2 illustrates an apparatus for health monitoring of wireless connections among vehicles, in accordance with the present disclosure. As illustrated in FIG. 2, each vehicle can include a plurality of antennas 220-1, 220-2 disposed on an external surface of the vehicle. While FIG. 2 illustrates two antennas on the vehicle, it is noted that more or fewer antennas may be disposed on each respective vehicle. For instance, as illustrated in FIG. 1, each vehicle may include four antennas disposed on a front surface of the vehicle. Each respective antenna is coupled to communications circuitry 221-1, 221-2, configured and arranged to facilitate communication with other vehicles in a vehicle platoon using a vehicle-to-vehicle communications protocol. The communications circuitry 221-1, and 221-2 can include a tuner 222-1, 222-2, as well as a baseband processor 224-1, 224-2. In such a manner, each of the respective antennas 220-1, 220-2 can be coupled to a respective tuner 222-1, 222-2 and baseband processor 224-1, 224-2. Similarly, each of the respective antennas 220-1, 220-2 can be coupled to processing circuitry 226 configured and arranged to monitor a health status of wireless communications links between the first vehicle and at least one other vehicle in the vehicle platoon. For instance, the processing circuitry 226 can include circuitry configured and arranged to receive from at least one antenna disposed on an external surface of a second vehicle in the vehicle platoon, object information including coordinates of stationary and moving objects within a threshold distance of the first vehicle and the second vehicle.

The processing circuitry can also include circuitry configured and arranged to determine using the received object information, a position and orientation of the second vehicle relative to the first vehicle. From this information, the vehicle can construct a model using modeling circuitry 228-3. In various embodiments, modeling circuitry 228-3 can receive the object information, determine the position and orientation of the vehicles, and construct the model. The modeling circuitry 228-3 may implement a distributed shared world model, which contains coordinates of the road, vehicles, and other stationary and moving objects. The distributed shared world model can be constructed by modeling circuitry 228-3 based on maps, as well as sensors, such as cameras, radars, vehicle to anything (V2X) communications, and lidars, among others. Using the V2V communication, the vehicles can distribute object information detected by their sensors. In such a manner, all vehicles can share a distributed world model. If the shared world model is unavailable, the vehicles can construct a shared world model using data from the local sensors (e.g., the sensors on the vehicles themselves) and maps available to the respective vehicles. Additionally and/or alternatively, if the map data is unavailable, local sensors' data can be used to compute relative position and orientation of the neighboring vehicles.

Figure 3:
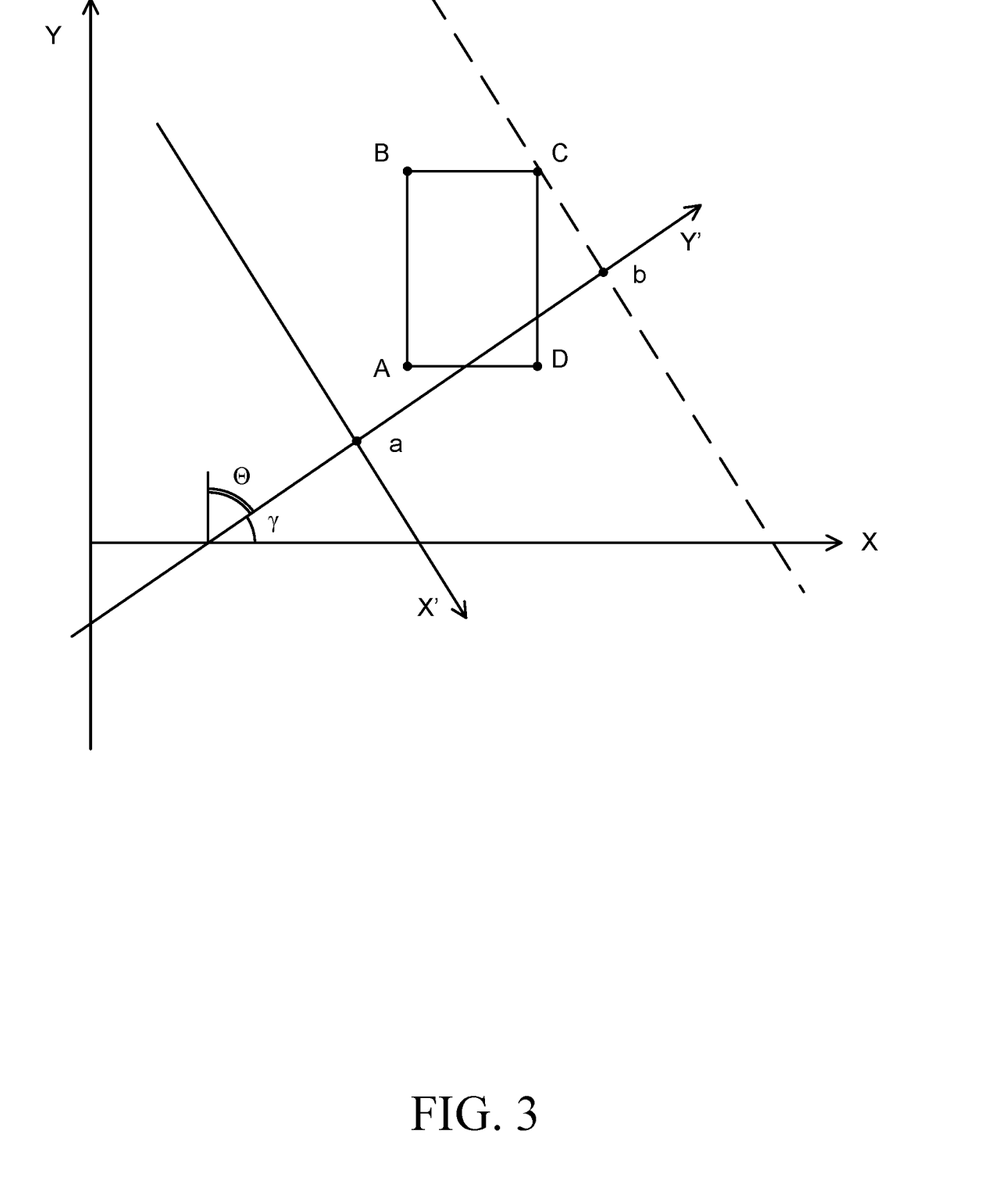
FIG. 3 illustrates an example coordinate system for calculation of obstructions as complex polygons, in accordance with the present disclosure.

The processing circuitry 226 can also include health monitoring circuitry 228-1. Once the vehicle position and orientation are available, the health monitoring circuitry 228-1 can perform a geometrical intersection calculation can determine if any part of the vehicle, another vehicle, or a building obstructs the line-of-sight. FIG. 3 illustrates an example coordinate system for calculation of obstructions as convex polygons, in accordance with the present disclosure. The polygon ABCD represents an obstruction to the direct line of sight communication between two antennas, represented as a line segment ah. First, the coordinate system of the model (e.g., generated by modelling circuitry 228-3) can be translated and rotated to have its origin parallel with other vehicles in the platoon. The coordinate system can be translated and rotated to have its origin in point a($x_a$,$y_a$) and the line segment ab on the v axis. All points in the new coordinate system are denoted below with ticks. Using the following matrix operations (as one of many sets of examples), the coordinates of the polygon's vertices $\mathbb{P}$ can be computed in the new coordinate system using the rotation angle θ and the following equations:

$$\theta = 90° - \gamma = 90° - \arctan\frac{y_b - y_a}{x_b - x_a}$$

$$\begin{bmatrix} x' \\ y' \end{bmatrix} = \begin{bmatrix} \cos\theta & \sin\theta \\ -\sin\theta & \cos\theta \end{bmatrix} \begin{bmatrix} x \\ y \end{bmatrix} - \begin{bmatrix} x_a \\ y_a \end{bmatrix}$$

$$\mathbb{P} = \{A', B', C', D'\}$$

Then compute two sets of polygon vertices $\mathbb{L}$ and $\mathbb{R}$ can be constructed, using the following equations:

$$\mathbb{S} = \{v : v \in \mathbb{P} \text{ and } 0 \leq y_v' \leq y_b'\}$$

$$\mathbb{L} = \{v : v \in \mathbb{S} \text{ and } x_v' \leq 0\}$$

$$\mathbb{R} = \{v : v \in \mathbb{S} \text{ and } x_v' \geq 0\}$$

The line-of-sight between two vehicles may be determined to be obstructed (e.g., line segment ab crosses the polygon ABCD)) if the cardinalities of the left and right sets are both larger than 0. That is, $|\mathbb{L}| > 0 \wedge |\mathbb{R}| > 0$. This calculation can be enhanced to involve the Fresnel zone. Objects within the Fresnel zone can disturb line-of-sight propagation even if they do not block the geometric line between antennas. Besides the two dimensional calculations, the line-of-sight check can be performed in three dimensions to include, for example, the landscape and obstacle height. This will allow the computation of line-of-sight properties of wireless links when crossing hills or mountains and properly estimate link viability over, for example, low-height vehicles.

Additionally, the health monitoring circuitry 228-1 may identify at least one of the plurality of antennas of the second vehicle as a primary antenna, based on the position and orientation of the second vehicle. The health monitoring circuitry 228-1 is further configured and arranged to determine the health status of the wireless communications links between the first vehicle and the second vehicle based on packets received from the primary antenna of the second vehicle by the plurality of antennas of the first vehicle. For instance, the health monitoring circuitry 228-1 may monitor the health status of wireless communications links between the first vehicle and the second vehicle, by analyzing at a predetermined time frequency, a packet drop rate for data packets transmitted from the primary antenna of the second vehicle to the plurality of antennas of the first vehicle. The health monitoring circuitry 228-1 may then determine that the wireless communications links between the first vehicle and the second vehicle are unhealthy in response to the packet drop rate exceeding a predefined threshold.

Processing circuitry 226 may also include platoon communications circuitry 228-2. In various embodiments, platoon communications circuitry 228-2 facilitates communications between vehicles in the platoon. For instance, the platoon communications circuitry 228-2 can send to a second vehicle (such as vehicle 104 illustrated in FIG. 1) a message indicating the wireless communications links between the first vehicle (e.g., 102 illustrated in FIG. 1) and the second vehicle are unhealthy, in response to a determination that more than a threshold number of packets were not received from the primary antenna of the second vehicle by the plurality of antennas of the first vehicle. Similarly, the platoon communications circuitry 228-2 can send to the second vehicle, a message communicating a change in the vehicle platoon in response to a determination that the wireless communications links between the first vehicle and the second vehicle are unhealthy. For instance, the platoon communications circuitry 228-2 can instruct the second vehicle to increase in a following distance between the first vehicle and the second vehicle. Additionally and/or alternatively, the platoon communications circuitry 228-2 can instruct both the first vehicle and the second vehicle to disengage from the vehicle platoon.

Processing circuitry 226 may also include driver assistance system circuitry 228-4. The driver assistance system circuitry 228-4 can facilitate the autonomous and/or semi-autonomous operation of the vehicle, and can cooperate with the platoon communications circuitry 228-2 to modify and/or disengage from a vehicle platoon.

Figure 4:
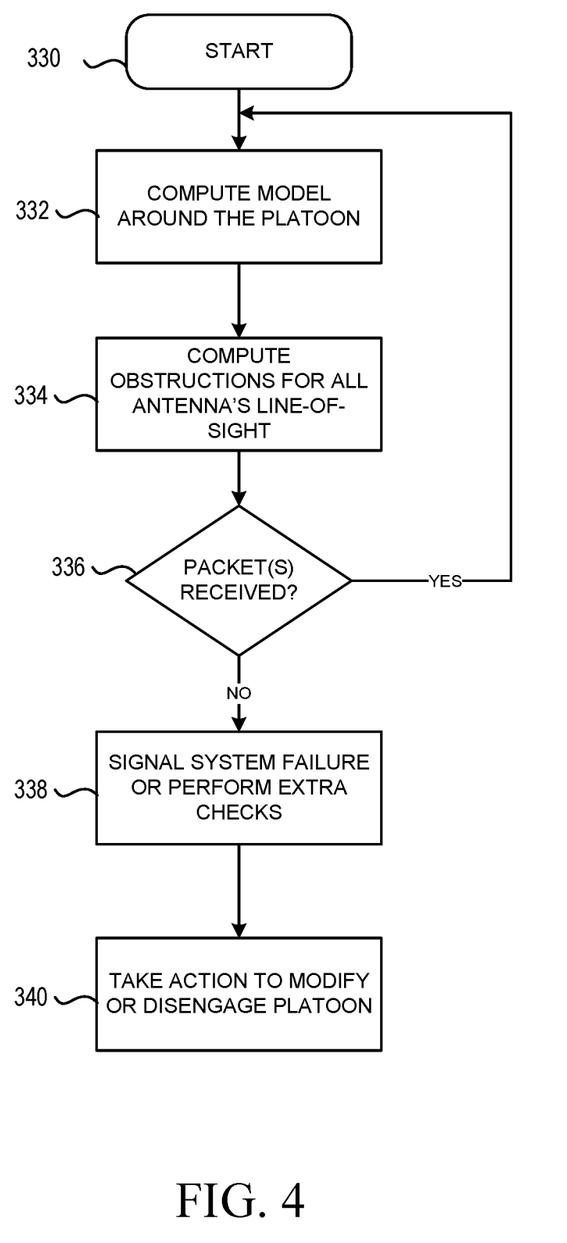
FIG. 4 illustrates a block diagram of a method for health monitoring of wireless connections among vehicles, in accordance with the present disclosure.

FIG. 4 illustrates a block diagram of a method for health monitoring of wireless connections among vehicles, in accordance with the present disclosure. The method starts at 330. At 332, the method includes computing a model around the platoon. The model may be generated using a shared world model, as discussed with regards to FIG. 2. At 334, the method includes computing obstructions for all antennas line-of-sight. For instance, referring to FIG. 1, the obstructions for antenna 106-1 would be computed, such that the second vehicle would not expect to receive a signal from it. At 336, the method includes determining if packets were received from both primary and secondary antennas. In some embodiments, determining if the packets were received includes determining if packets were received from the primary antennas over a threshold period of time. For instance, a packet drop rate for data packets transmitted from the primary antenna of the second vehicle to the plurality of antennas of the first vehicle may be analyzed at a predetermined time frequency, and a determination that the wireless communications links between the first vehicle and the second vehicle are unhealthy may be made in response to the packet drop rate exceeding a predefined threshold. As another illustration, the processing circuitry is configured and arranged to send to the second vehicle, a message indicating the wireless communications links between the first vehicle and the second vehicle are unhealthy, in response to a determination that more than a threshold number of packets were not received from the primary antenna of the second vehicle by the plurality of antennas of the first vehicle.

If, at 336, the processing circuitry determines that the packets were received, the method returns to 332. If, at 336, the processing circuitry determines that the packets were not received (e.g., that the communication path is not healthy), then the method proceeds to 338, where a signal is generated indicating system failure, or the system performs extra checks.

At 340, the method includes taking action to modify or disengage the platoon responsive to a system failure. For instance, the system may initiate a change in the vehicle platoon includes an increase in a following distance between the first vehicle and the second vehicle. Similarly, the change in the vehicle platoon includes instructions for both the first vehicle and the second vehicle to disengage from the vehicle platoon.

Figure 5:
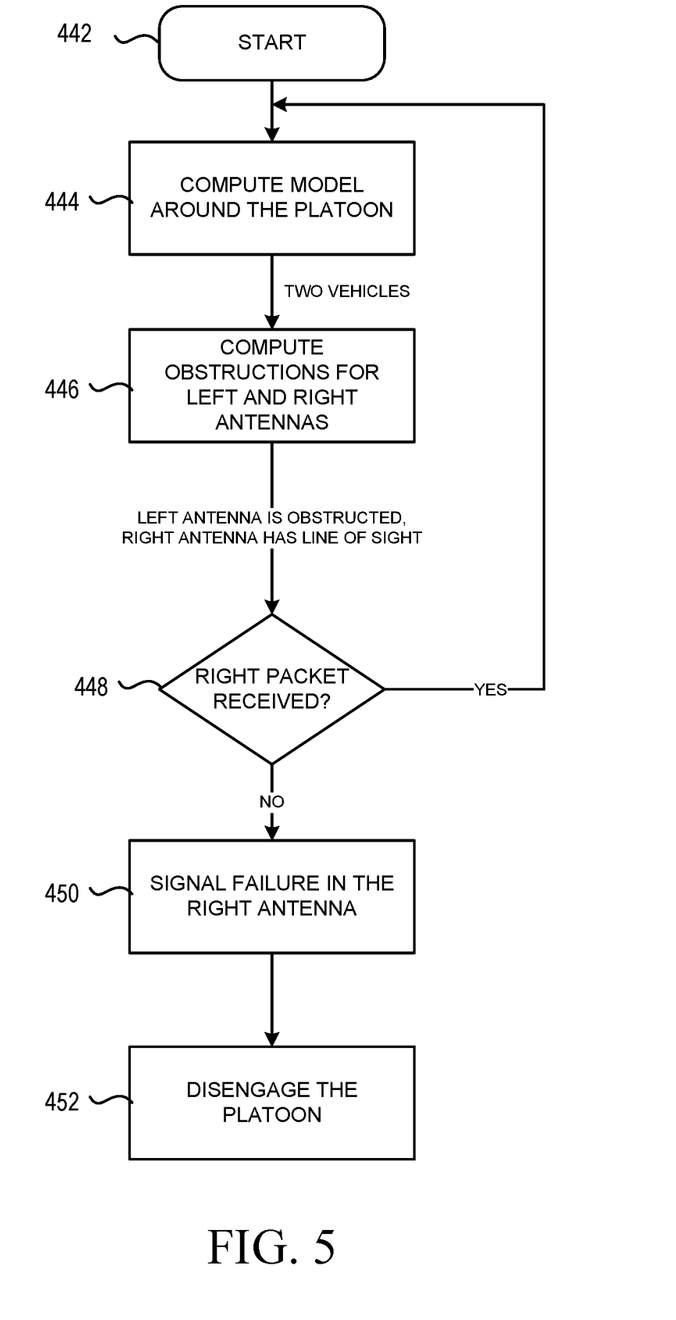
FIG. 5 illustrates an additional block diagram of a method for health monitoring of wireless connections among vehicles, in accordance with the present disclosure.

FIG. 5 illustrates an additional block diagram of a method for health monitoring of wireless connections among vehicles, in accordance with the present disclosure. The method begins at 442. At 444, the method includes computing a model around the platoon, as discussed with regards to FIG. 4. In the example illustrated in FIG. 5, two vehicles are in the platoon. At 446, the method includes computing instructions for the left and right antennas. For instance, the CPU of the first vehicle can determine that the left antenna is obstructed, and the right antenna has line-of-sight (as is illustrated in FIG. 1). In this example, the right antenna may be identified as a primary antenna, and the left antenna may be identified as a secondary antenna. As such, at 448, the method may include determining if the right packets are received. If packets were received from the right antenna, the method repeats back to 444. If packets were not received, at 450, the method may include signaling a failure in the right antenna. In response to the failure in the right antenna, at 452, the method may include disengaging the platoon. Other actions may be taken in response to the failure signal, as discussed herein.

Figure 6:
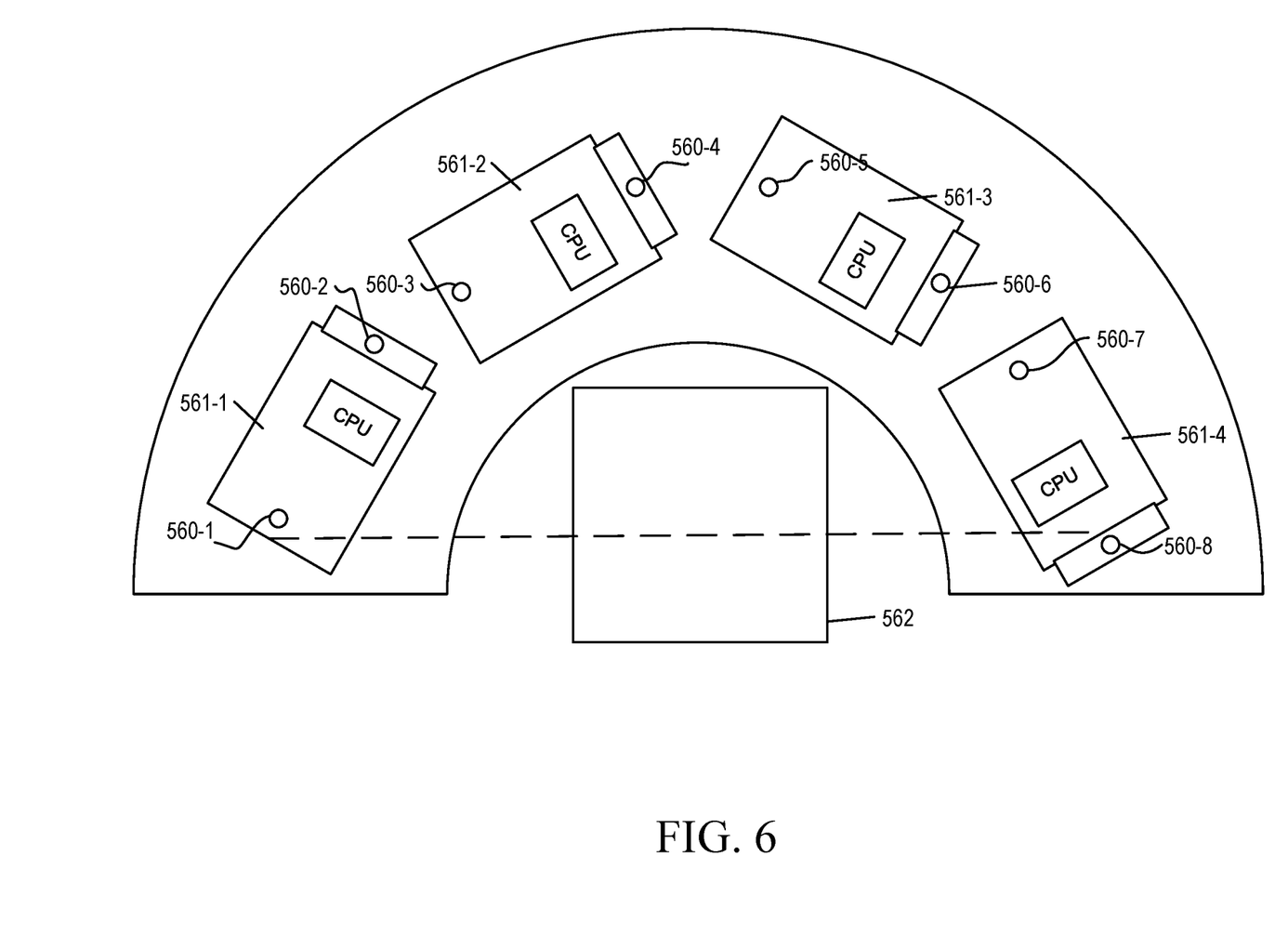
FIG. 6 illustrates an environment for health monitoring of wireless connections among vehicles, in accordance with the present disclosure.

FIG. 6 illustrates an environment for health monitoring of wireless connections among vehicles, in accordance with the present disclosure. As illustrated in FIG. 6, four vehicles 561-1, 561-2, 561-3, 561-4 may be in the platoon. Each respective vehicle may have antennas 560-1, 560-2, 560-3, 560-4, 560-5, 560-6, 560-7, 560-8 disposed on an external surface of the vehicle. As discussed herein, each vehicle may have more or fewer antennas disposed on the external surface of the vehicle. Additionally and/or alternatively, each respective antenna may be located in a different position on the vehicle. For instance, the antennas may be disposed on a side of the vehicle, on a roof, on a front end, and/or on a back end of the vehicle. Each vehicle may communicate with one another, such as by way of a V2V communications protocol. In the example illustrated in FIG. 6, the vehicles in the platoon may travel about an obstacle 562. Due to the obstruction caused by the obstacle 562, the signal from antenna 560-1 of vehicle 561-1 may not be received by antenna 560-8 of vehicle 561-4. Accordingly, each of the vehicles 561 in the platoon may communicate with one another, such that it is not expected that signals are received from antenna 560-8 of vehicle 561-4 since the signal is obstructed by obstacle 562, as discussed with regards to FIG. 1, FIG. 2, FIG. 4, and FIG. 5.

Figure 7:
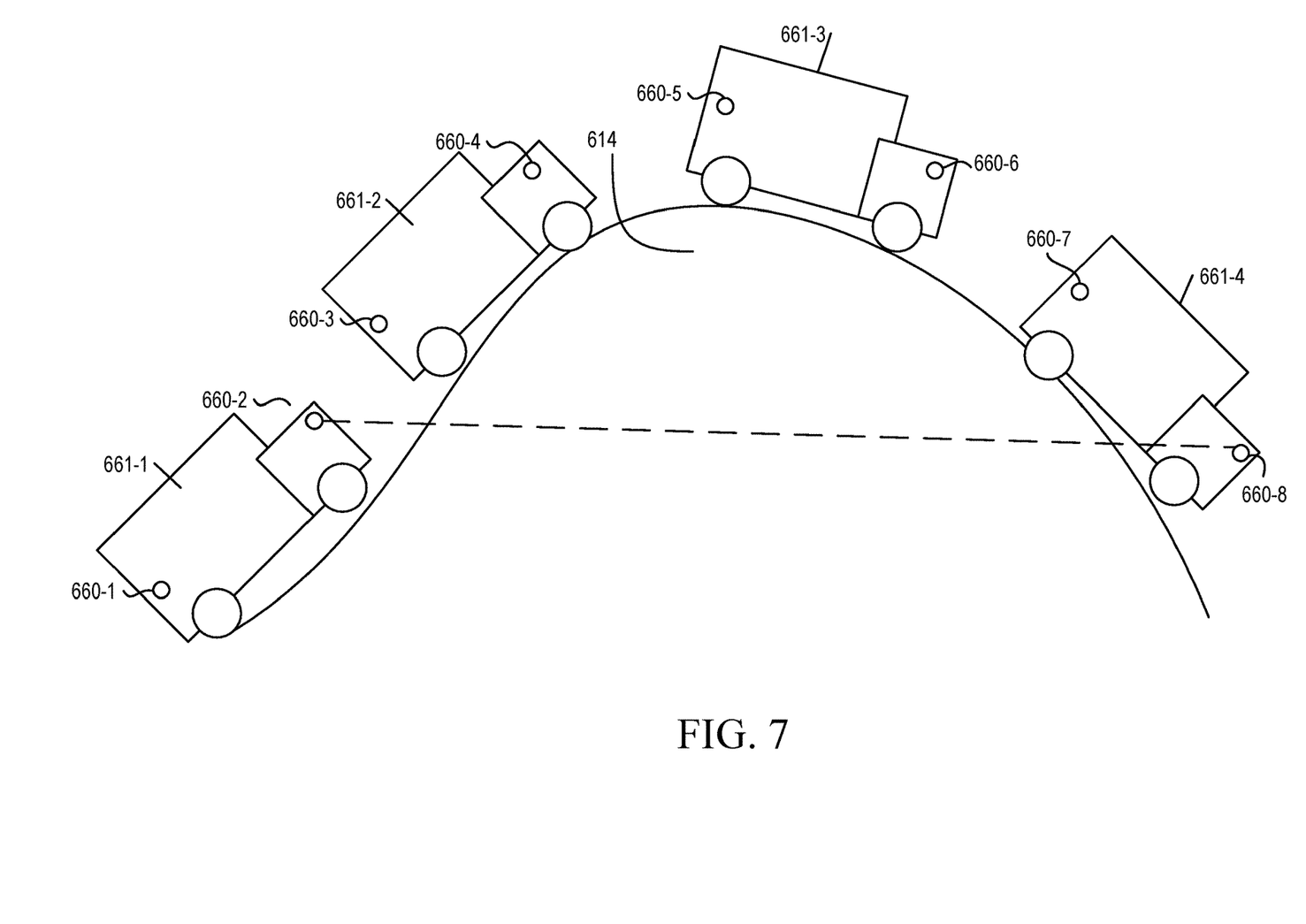
FIG. 7 further illustrates an environment for health monitoring of wireless connections among vehicles, in accordance with the present disclosure.

FIG. 7 further illustrates an environment for health monitoring of wireless connections among vehicles, in accordance with the present disclosure. As illustrated in FIG. 7, the platoon may include four vehicles 661-1, 661-2, 661-3, and 661-4 each communicatively coupled. In the example illustrated in FIG. 7, signals transmitted from antenna 660-2 of vehicle 660-1 may be obstructed from being received by antenna 660-8 of vehicle 661-4 due to the curvature in the hill 614. For instance, when the vehicles of the platoon travel over a hill 614, the signals from a first vehicle 661-1 may be obstructed from vehicle 661-4. Accordingly, each of the vehicles 661 in the platoon may communicate with one another, such that it is not expected that signals are received from antenna 660-2 of vehicle 661-1 since the signal is obstructed by hill 614, as discussed with regards to FIG. 1, FIG. 2, FIG. 4, and FIG. 5.

Various example embodiments include a processor-readable tangible non-transitory medium (such as CPUs 110 and 112 illustrated in FIG. 1), storing a computer program for health monitoring of wireless connections among vehicles. The computer program includes instructions to monitor a health status of wireless communications links between the first vehicle and at least one other vehicle in the vehicle platoon. For instance, the computer program may include instructions executable by a processor to receive from at least one antenna disposed on an external surface of a second vehicle in the vehicle platoon, object information including coordinates of stationary and moving objects within a threshold distance of the first vehicle and the second vehicle. The computer program may further include instructions executable by the processor to determine, using the received object information, a position and orientation of the second vehicle relative to the first vehicle, and to identify at least one of the plurality of antennas of the second vehicle as a primary antenna, based on the position and orientation of the second vehicle. Moreover, the computer program may include instructions executable by the processor to determine the health status of the wireless communications links between the first vehicle and the second vehicle based on packets received from the primary antenna of the second vehicle by the plurality of antennas of the first vehicle. As described herein, the computer program may include instructions executable by the processor to determine the health status of the wireless communications links between the plurality of vehicles based on a percentage of packets received from the primary antennas and the secondary antennas. Additionally and/or alternatively, the computer program may include instructions executable by the processor to determine the health status of the communications links based on the packet drop rate during a sampling time.

In various example embodiments, the computer program may include instructions executable by the processor to send messages to the vehicles in a platoon indicating that the wireless communications links are unhealthy. Similarly, the computer program may include instructions executable by the processor to send a message communicating a change in the vehicle platoon in response to a determination that the wireless communications links between the first vehicle and the second vehicle are unhealthy. For instance, the instructions may cause a message to be sent to the vehicles in the vehicle platoon, directing the vehicles to increase the following distance between vehicles, and/or to disengage from the vehicle platoon entirely. The computer program may include instructions executable by the processor to implement the method, apparatus, and system, as described with regards to FIG. 1, FIG. 2, FIG. 4, and FIG. 5.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, device, system, and/or other circuit-type depictions (e.g., reference numerals 110, 112, 109-1, 109-2, 109-3, and 109-4 of FIG. 1 and reference numerals 226, 228-1, 228-2, 228-3, 228-4 of FIG. 2 depict a block as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 1, 2, 4, and 5. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described and illustrated with regards to FIGS. 4 and 5 is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first vehicle," a "second vehicle," etc., the adjectives "first" and "second" are not used to connote any description of the structure or to provide any substantive meaning; rather, such adjectives are merely used for English-language antecedence to differentiate one such similarly-named structure from another similarly-named structure.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, one or more steps illustrated and discussed with regards to FIGS. 1, 4 and 5 may be skipped entirely. Such modifications do not depart from the true spirit and scope of various aspects of the disclosure, including aspects set forth in the claims.

What is claimed is:

1. A method comprising:
   receiving as input to processing circuitry configured and arranged to monitor a health status of wireless communications links between a plurality of vehicles in a vehicle platoon, object information including coordinates of stationary and moving objects;
   determining, using the received object information, a relative location of a vehicle among the plurality of vehicles in the vehicle platoon;
   determining, based on the received object information and the relative location of the vehicle, physical parameters for line-of-sight wireless communications between the vehicle and other vehicles in the vehicle platoon; and
   determining the health status of the wireless communications links between the plurality of vehicles in the vehicle platoon using the physical parameters for the line-of-sight wireless communications.

2. The method of claim 1, wherein determining a relative location of a vehicle among the plurality of vehicles in the vehicle platoon includes determining a relative position, orientation, and physical dimensions of the vehicle.

3. The method of claim 1, wherein each of the plurality of vehicles in the vehicle platoon includes a plurality of antennas configured and arranged to wirelessly communicate with the other vehicles in the vehicle platoon using a vehicle-to-vehicle communications protocol, the method including:
   identifying less than all of the antennas as primary antennas; and
   generating an error signal in response to a determination that communications packets were not received from at least one of the primary antennas within a threshold period of time.

4. The method of claim 1, wherein each of the plurality of vehicles in the vehicle platoon includes a plurality of antennas configured and arranged to wirelessly communicate with the other vehicles in the vehicle platoon using a vehicle-to-vehicle communications protocol, the method including:
   identifying less than all of the antennas as primary antennas and a remainder of the antennas as secondary antennas; and
   determining the health status of the wireless communications links between the plurality of vehicles based on a percentage of packets received from the primary antennas and the secondary antennas.

5. The method of claim 1, the method including:
   determining a packet drop rate corresponding to a percentage of data packets not received over the wireless communications links during a sampling time; and
   determining the health status of the communications links based on the packet drop rate during the sampling time.

6. An apparatus comprising:
   a plurality of antennas disposed on an external surface of a first vehicle, wherein each respective antenna is coupled to communications circuitry configured and arranged to facilitate communication with other vehicles in a vehicle platoon using a vehicle-to-vehicle communications protocol; and processing circuitry configured and arranged to monitor a health status of wireless communications links between the first vehicle and at least one other vehicle in the vehicle platoon, by:
- receiving from at least one antenna disposed on an external surface of a second vehicle in the vehicle platoon, object information including coordinates of stationary and moving objects within a threshold distance of the first vehicle and the second vehicle;
- determining, using the received object information, a position and orientation of the second vehicle relative to the first vehicle;
- identifying at least one of the plurality of antennas of the second vehicle as a primary antenna, based on the position and orientation of the second vehicle; and
- determining the health status of the wireless communications links between the first vehicle and the second vehicle based on packets received from the primary antenna of the second vehicle by the plurality of antennas of the first vehicle.

7. The apparatus of claim 6, wherein each of the plurality of antennas is coupled to a different respective tuner and baseband processor.

8. The apparatus of claim 6, wherein the processing circuitry is configured and arranged to send to the second vehicle, a message indicating the wireless communications links between the first vehicle and the second vehicle are unhealthy, in response to a determination that more than a threshold number of packets were not received from the primary antenna of the second vehicle by the plurality of antennas of the first vehicle.

9. The apparatus of claim 6, wherein the processing circuitry is configured and arranged to monitor the health status of wireless communications links between the first vehicle and the second vehicle, by:
- analyzing at a predetermined time frequency, a packet drop rate for data packets transmitted from the primary antenna of the second vehicle to the plurality of antennas of the first vehicle; and
- determining that the wireless communications links between the first vehicle and the second vehicle are unhealthy in response to the packet drop rate exceeding a predefined threshold.

10. The apparatus of claim 6, wherein the processing circuitry is configured and arranged to send to the second vehicle, a message communicating a change in the vehicle platoon in response to a determination that the wireless communications links between the first vehicle and the second vehicle are unhealthy.

11. The apparatus of claim 10, wherein the change in the vehicle platoon includes an increase in a following distance between the first vehicle and the second vehicle.

12. The apparatus of claim 10, wherein the change in the vehicle platoon includes instructions for both the first vehicle and the second vehicle to disengage from the vehicle platoon.

13. A system comprising:
- a plurality of antennas disposed on an external surface of a vehicle in a vehicle platoon, wherein each respective antenna is coupled to communications circuitry configured and arranged to facilitate communication with other vehicles in the vehicle platoon using a vehicle-to-vehicle communications protocol; and
- processing circuitry configured and arranged to monitor a health status of wireless communications links between the vehicle and a remainder of the vehicles in the vehicle platoon, by:
  - receiving from the remainder of vehicles in the vehicle platoon, object information including coordinates of stationary and moving objects within a threshold distance of the vehicle platoon;
  - determining, using the received object information, a position and orientation of the vehicle relative to the remainder of vehicles;
  - identifying at least one of the plurality of antennas of the vehicle as a primary antenna and at least one of the plurality of antennas of the vehicle as a secondary antenna, based on the position and orientation of the vehicle; and
  - determining the health status of the wireless communications links between the vehicle and the remainder of vehicles in the vehicle platoon based on packets received from the primary or secondary antenna of the vehicle.

14. The system of claim 13, wherein each of the vehicles in the vehicle platoon includes a plurality of antennas configured and arranged to wirelessly communicate with the other vehicles in the vehicle platoon using the vehicle-to-vehicle communications protocol, wherein the processing circuitry is further configured and arranged to:
- communicate to the plurality of vehicles in the vehicle platoon, instructions to perform additional health status checks of the wireless communications links in response to a determination that communications packets were not received from the primary antenna within a threshold period of time.

15. The system of claim 13, wherein each of the plurality of vehicles in the vehicle platoon includes a plurality of antennas configured and arranged to wirelessly communicate with the other vehicles in the vehicle platoon using the vehicle-to-vehicle communications protocol, wherein the processing circuitry is further configured and arranged to:
- communicate to the plurality of vehicles in the vehicle platoon, instructions to modify configuration of the vehicle platoon in response to a determination that communications packets were not received from the primary antenna within a threshold period of time.

16. The system of claim 13, wherein the processing circuitry is further configured and arranged to:
- construct a model of the stationary and moving objects within the threshold distance of the vehicle platoon, using the object information received from the remainder of the vehicles in the vehicle platoon; and
- wherein the position and orientation of the vehicle is determined using the constructed model.

17. The system of claim 13, wherein the processing circuitry is further configured and arranged to:
- construct a model of the stationary and moving objects within the threshold distance of the vehicle platoon, using topological maps and sensor data received from the remainder of the vehicles in the vehicle platoon; and
- wherein the position and orientation of the vehicle is determined using the constructed model.

18. The system of claim 13, wherein the processing circuitry is further configured and arranged to:
- construct a model of the stationary and moving objects within the threshold distance of the vehicle platoon, using sensor data received from the remainder of the vehicles in the vehicle platoon; and wherein the position and orientation of the vehicle is determined using the constructed model.

19. The system of claim 13, wherein the processing circuitry is further configured and arranged to:
   determine for each of the remainder of vehicles in the vehicle platoon, a position, an orientation, and a dimension of the respective vehicle; and
   determine, using the object information, which of the wireless communications links between the vehicles in the vehicle platoon may be obstructed based on the determined position, orientation, and dimension of each respective vehicle in the vehicle platoon.

20. The system of claim 19, wherein the processing circuitry is further configured and arranged to determine if the wireless communications links between a first vehicle in the vehicle platoon and a second vehicle in the vehicle platoon may be obstructed by determining if a stationary or moving object obstructs a line-of-sight between the antennas of the first vehicle and the antennas of the second vehicle.

* * * * *